(12) United States Patent
Lu

(10) Patent No.: US 10,855,478 B2
(45) Date of Patent: Dec. 1, 2020

(54) METHOD AND APPARATUS FOR PROTECTING EMBEDDED SOFTWARE

(71) Applicant: Taiwan Semiconductor Manufacturing Co., Ltd., Hsin-Chu (TW)

(72) Inventor: Shih-Lien Linus Lu, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 171 days.

(21) Appl. No.: 16/101,969

(22) Filed: Aug. 13, 2018

(65) Prior Publication Data

US 2020/0052912 A1 Feb. 13, 2020

(51) Int. Cl.
*H04L 9/32* (2006.01)
*H04L 9/30* (2006.01)
*G06F 8/65* (2018.01)

(52) U.S. Cl.
CPC .............. *H04L 9/3278* (2013.01); *G06F 8/65* (2013.01); *H04L 9/30* (2013.01)

(58) Field of Classification Search
CPC ....... H04L 9/3278; H04L 9/30; H04L 9/0866; H04L 9/0891; G06F 8/65
See application file for complete search history.

(56) References Cited

U.S. PATENT DOCUMENTS

| | | | | |
|---|---|---|---|---|
| 2008/0271132 | A1* | 10/2008 | Jokela | H04L 63/0823 726/10 |
| 2013/0010957 | A1* | 1/2013 | Yu | H04L 9/0866 380/260 |
| 2019/0129493 | A1* | 5/2019 | Li | G06F 1/3246 |
| 2019/0280884 | A1* | 9/2019 | Kameo | H04L 9/0866 |
| 2019/0385489 | A1* | 12/2019 | Norrman | H04L 9/0631 |

* cited by examiner

*Primary Examiner* — Mohammed Waliullah
(74) *Attorney, Agent, or Firm* — Duane Morris LLP

(57) ABSTRACT

Disclosed is a device and method to secure software update information for authorized entities. In one embodiment, a device for receiving secured software update information from a server, the device includes: a physical uncolonable function (PUF) information generator, comprising a PUF cell array, configured to generate PUF information, wherein the PUF information comprises at least one PUF response output, wherein the at least one PUF response output is used to encrypt the software update information on the server so as to generate encrypted software update information; a first encrypter, configured to encrypt the PUF information from the PUF information generator using one of at least one public key from the server so as to generate encrypted PUF information; and a second encrypter, configured to decrypt the encrypted software update information using one of the at least one PUF response output so as to obtain the software update information.

20 Claims, 7 Drawing Sheets

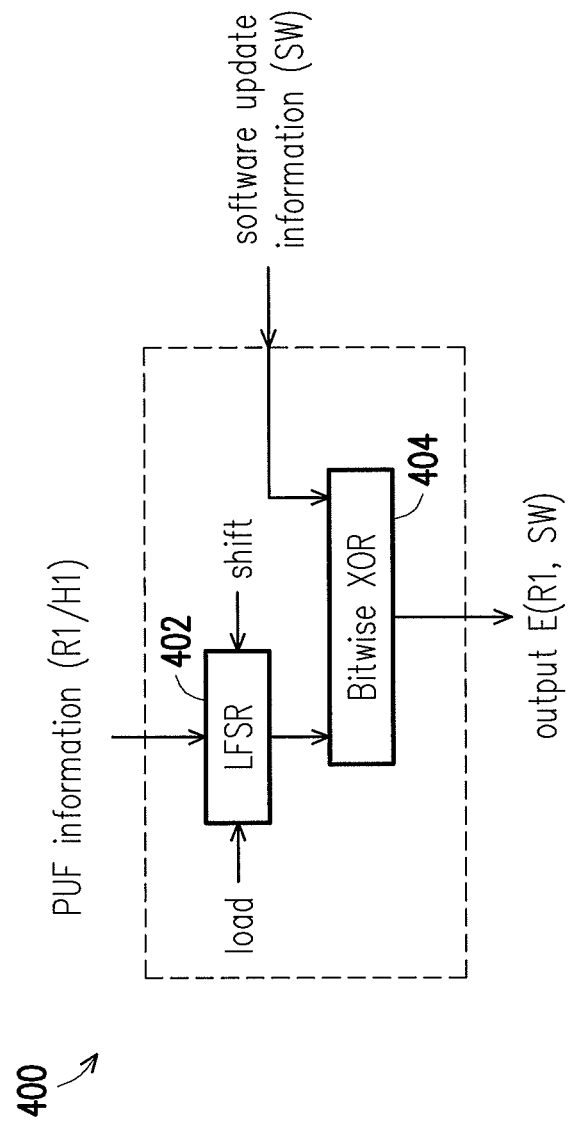

| Device # | Challenge | Response |
|---|---|---|
| 1 | $C_{1-1}, C_{1-2}, \ldots$ | $R_{1-1}, R_{1-2}, \ldots$ |
| 2 | $C_{2-1}, C_{2-2}, \ldots$ | $R_{2-1}, R_{2-2}, \ldots$ |
| .... | .... | .... |
| K | $C_{K-1}, C_{K-2}, \ldots$ | $R_{K-1}, R_{K-2}, \ldots$ |

FIG. 6

METHOD AND APPARATUS FOR PROTECTING EMBEDDED SOFTWARE

BACKGROUND

With the increasing use of integrated circuits in electronic devices that provide different types of information for a variety of different applications, there has been an increasing need to protect sensitive and/or critical information that may be stored within an electronic device to limit access to such information to only other devices that have permission to access the information. For example, devices configured for use in internet of things (IoT) applications are vulnerable since they are physically available for attacks and unauthorized modifications (e.g., hacking). Therefore, it is necessary to protect the embedded software in IoT devices in order to prevent unauthorized users to reverse engineer the software and/or modify information stored in the IoT devices. Despite this long felt need, no suitable devices or methods capable of preventing such attacks are available.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of illustration.

FIG. 4A illustrates an exemplary block diagram of an encrypter of a server for encrypting software update information using a PUF response received from a device, in accordance with some embodiments of the present disclosure.

FIG. 6 illustrates a table showing a plurality of devices and a plurality of challenge/response pairs of the corresponding devices, in accordance with some embodiments of the present disclosure.

DETAILED DESCRIPTION OF EXEMPLARY EMBODIMENTS

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

A physically unclonable function (PUF) generator is generally used for authentication and secret key storage without requiring secure electrically erasable programmable read-only memory (EEPROMs) and/or other expensive hardware (e.g., battery-backed static random-access memory). Instead of storing a key in a digital memory, a PUF generator derives a key based on its unique physical characteristics caused by inherent process variations to differentiate itself from others that are produced even from a same fabrication process. Generally, such key is referred to as a "PUF response." Variations in a number of parameters can be used to define such a signature such as, for example, gate delay, threshold voltage, power-on state of a SRAM-based device, and/or any of a variety of physical characteristics of an IC. Furthermore, a charge decay (e.g., discharge process) can be also used as a PUF response, which is typically used in DRAM-based PUF generators. In the present disclosure, a circuit and method to protect IoT devices from hacking is presented.

Figure 1:
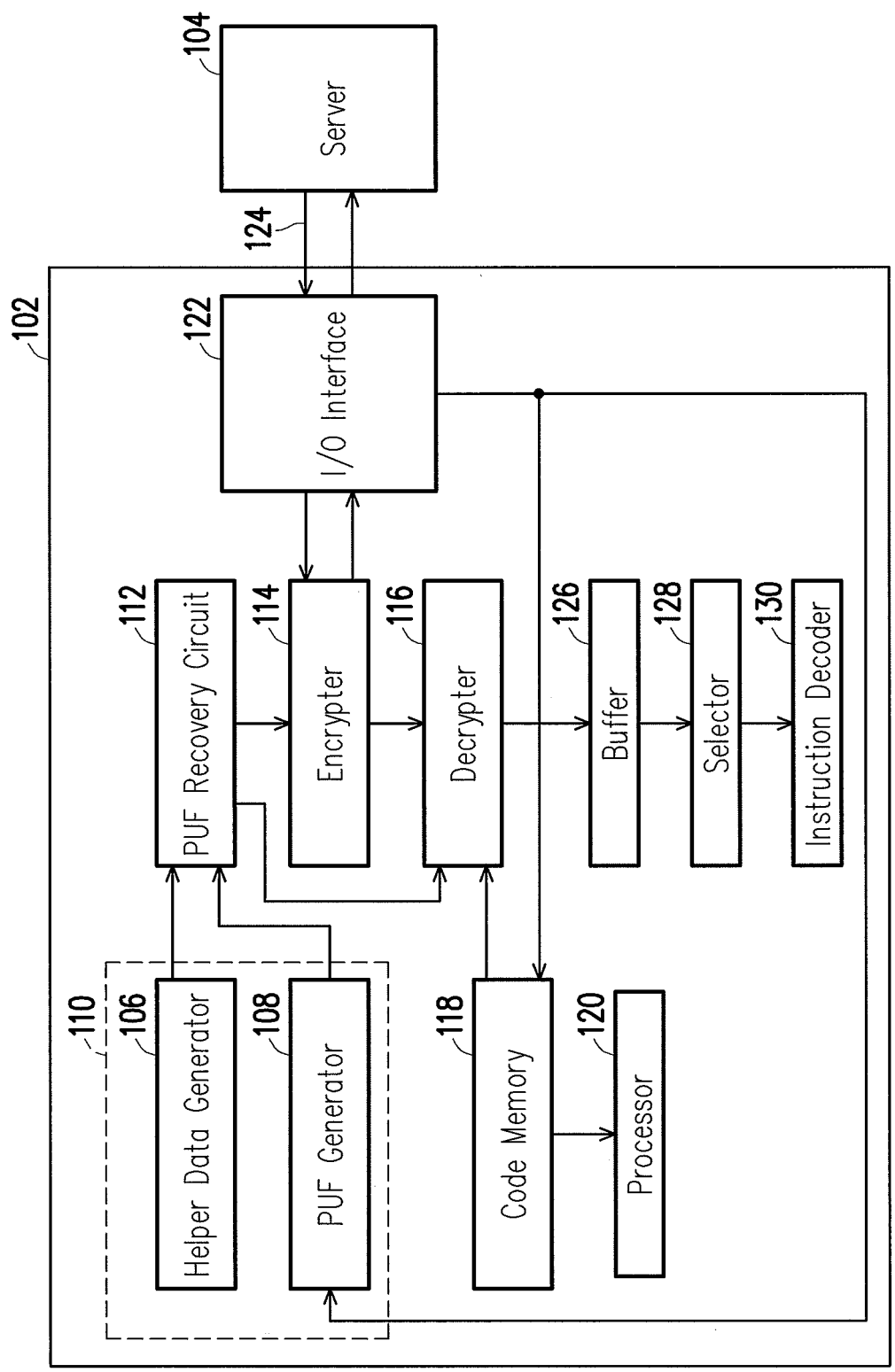
FIG. 1 illustrates an exemplary block diagram of a system, in accordance with some embodiments of the present disclosure.

FIG. 1 illustrates an exemplary block diagram of a system 100, in accordance with some embodiments of the present disclosure. It is noted that the system 100 is merely an example, and is not intended to limit the present disclosure. Accordingly, it is understood that additional functional blocks may be provided in or coupled to the system 100 of FIG. 1, and that some other functional blocks may only be briefly described herein.

In some embodiments, the system 100 comprises a device 102, and a server 104. It is noted that system 100 is merely an example and may comprise a plurality of devices 102 that can communicate with the server 104. In the illustrated embodiment, the device 102 comprises a helper data generator 106, and a PUF generator 108. In some embodiments, the helper data generator 106 and the PUF generator 108 are coupled together to form a PUF information generator 110. In the illustrated embodiment, the device 102 further comprises a PUF recovery circuit 112, an encrypter 114, a decrypter 116, and a code memory 118. In some embodiments, as discussed in further detail below with reference to FIG. 2, the PUF generator 108 comprises a PUF cell array, which is used to generate a PUF response corresponding to a challenge. In some embodiments, a PUF cell array is a circuit that measures the inherent and random manufacturing variations present in a device in order to generate a unique signature key in response to an input (i.e., challenge). In some embodiments, the PUF generator 108 may further comprise post- or pre-processing error correction, a noise injector for quick identification of unstable bit cells, a population counter, etc., which are not shown in FIG. 1.

In some embodiments, the helper data generator 106 is configured to produce helper data which can be transmitted to a server together with the PUF response after being encrypted by a public key. In some embodiments, the public key that is used to encrypt the PUF response and the helper data is generated by and received from the server. In some embodiments, the helper data generator 106 contains helper data algorithms for error correction to extract a normal PUF response from a noisy PUF response generated by the PUF cell array of the PUF generator 108. In some embodiments, the helper data can be also used to derive a noisy PUF response from a normal PUF response. In some embodiments, the helper data generator 106 can also be a memory unit used to store pre-generated helper data.

In some embodiments, the encrypter 114 and the decrypter 116 are for data encryption and decryption purposes. Specifically, in some embodiments, the encrypter 114 of the device 102 can be used to encrypt the PUF response and the helper data generated by the PUF generator 108 using a received public key from the server 104, which are further transmitted to the server 104 in a secured communication 124 through the input/output (I/O) interface 122, according to some embodiments. In some embodiments, the decrypter 116, upon receiving cipher texts (e.g., encrypted software updates), can be used together with the corresponding PUF response, to derive plain texts (e.g., software update instructions). In some embodiments, the encrypter 114 and the decrypter 116 are both coupled to the I/O interface 122 for receiving and transmitting cipher texts, respectively. In some embodiments, encryption and decryption processes on the encrypter 114 and the decrypter 116 are based on the PUF response produced by the PUF generator 108, respectively. In some embodiments, the encrypter 114 and the decrypter 116 are symmetric. In some other embodiments, the encrypter 114 and the decrypter 116 are asymmetric.

In some embodiments, the encrypted software update information received from the server 104 is encrypted by an advanced encryption standard (AES) with an instruction width of 128, 192 or 256 bits. The encrypted software update information may be decrypted in blocks on the device 102 using the decrypter 116. Since the encryption process and/or decryption process is done through a block cipher, program codes are encrypted in blocks. For example, the encryption is done in 128 b chunk. Therefore, a loading and a decryption of the entire blocks are required before a complete instruction can be obtained for execution. For example, a 32-bit RISC (reduced instruction set computer) machine may comprise 4 instructions in a 128-bit block. These 4 instructions are decoded in 32 bits each time and take 4 machine cycles to complete. So each decryption cycles can provide 4 instructions. In some embodiments, when a branch is present and taken, a nearest 128 bit block of encrypted program code which is pointed by a branch target location, is loaded. In some embodiments, the PUF recovery circuit 112 is a device in which the helper data is used to filter out noises and recover a normal PUF response from a corrupted PUF response, for example, under some operation conditions or aged devices. For example, the PUF recovery circuit 112 is an error correcting code (ECC) circuit to correct corrupted bits in a PUF output. In some embodiments, the helper data can be check bits of ECC. When a data is sent from the device 102 to a server 104, the PUF recovery circuit 112 is used to derive the helper data which is sent together with the encrypted data using the encrypter 114 through the I/O interface 122 to the server 104. When the device 102 receives an encrypted software update from the server 104, it uses the helper data to correct the PUF response if necessary to derive the normal PUF response for decryption using the decrypter 116.

In some embodiments, the device 102 also comprises a processor 120. The processor 120 may comprise any processing circuitry operative to control the operations and performance of the device 102 of the system 100. In various aspects, the processor 120 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor 120 also may be implemented as a controller, a microcontroller, an application specific integrated circuit (ASIC), a field programmable gate array (FPGA), a programmable logic device (PLD), and so forth.

In various aspects, the processor 120 may be arranged to run an operating system (OS) and various applications. Examples of an OS comprise, for example, operating systems generally known under the trade name of Apple OS, Microsoft Windows OS, Android OS, and any other proprietary or open source OS. Examples of applications comprise, for example, a telephone application, a camera (e.g., digital camera, video camera) application, a browser application, a multimedia player application, a gaming application, a messaging application (e.g., email, short message, multimedia), a viewer application, and so forth.

In some embodiments, the I/O interface 122 may comprise any suitable mechanism or component to at least enable a server 104 to provide input to the device 102 and the device 104 to provide output to the server 102. For example, the I/O interface 122 may comprise any suitable input mechanism, including but not limited to, a button, keypad, keyboard, click wheel, touch screen, or motion sensor. In some embodiments, the I/O interface may comprise a capacitive sensing mechanism, or a multi-touch capacitive sensing mechanism (e.g., a touchscreen).

In some embodiments, the I/O interface 122 may comprise a visual peripheral output device for providing a display visible to the user. For example, the visual peripheral output device may comprise a screen such as, for example, a Liquid Crystal Display (LCD) screen, incorporated into the device 102 of the system 100. As another example, the visual peripheral output device may comprise a movable display or projecting system for providing a display of content on a surface remote from the device 102. In some embodiments, the visual peripheral output device can comprise a coder/decoder, also known as a Codec, to convert digital media data into analog signals. For example, the visual peripheral output device may comprise video Codecs, audio Codecs, or any other suitable type of Codec.

The visual peripheral output device also may comprise display drivers, circuitry for driving display drivers, or both. The visual peripheral output device may be operative to display content under the direction of a processor 120. For example, the visual peripheral output device may be able to play media playback information, application screens for applications implemented on the device 102, information regarding ongoing communications operations, information regarding incoming communications requests, or device operation screens, to name only a few.

In some embodiments, the I/O interface 122 may comprise any suitable hardware, software, or combination of hardware and software that is capable of coupling the device 102 to a server 104 and/or other devices 102 with a same or different network. The I/O interface 122 may be arranged to operate with any suitable technique for controlling information signals using a desired set of communications protocols, services or operating procedures. The I/O interface 122 may comprise the appropriate physical connectors to connect with a corresponding communications medium, whether wired or wireless.

In some embodiments, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fiber Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the I/O interface 122 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the I/O interface 122 may comprise a wireless interface comprising one or more antennas, transmitters, receivers, transceivers, amplifiers, filters, control logic, and so forth.

In some embodiments, the I/O interface 122 may provide communication functionalities in accordance a number of wireless protocols. Examples of wireless protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1xRTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electromagnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, the code memory 118 is a non-volatile memory which can be based on a one-time programmed (OTP) technology. In some embodiments, the memory unit 118 is a read-only memory (ROM), an electronic fuse (eFuse), or any other types of OTP memories. In some embodiments, the code memory 118 is used to store the encrypted software updates information upon received from the server 104 through the I/O interface 122.

In some embodiments, the code memory 118 of the device 102 may comprise any machine-readable or computer-readable media capable of storing data, including both volatile/non-volatile memory and removable/non-removable memory. The code memory 118 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the device 102 of the system 100.

For example, the code memory 118 may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the code memory 118 may contain an instruction set, in the form of a file for executing a method of generating one or more timing libraries as described herein. The instruction set may be stored in any acceptable form of machine-readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processor 120.

In some embodiments, the encrypted software update information is received at the I/O interface 122 and stored in the code memory 118 before further transmitted to the decrypter 116 for decryption. In some embodiments, the decrypted software update information by the decrypter 116 is transmitted to and temporarily stored in a buffer 126 before further selected by a selector 128 and decoded by an instruction decoder 130.

Figure 2:
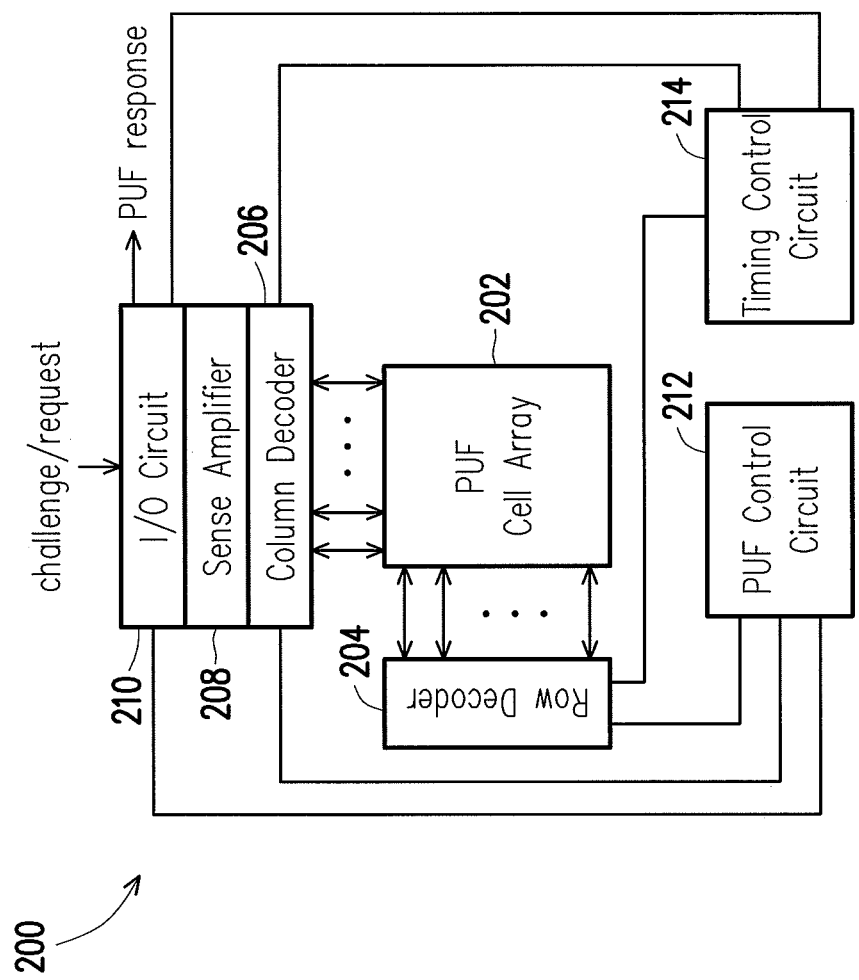
FIG. 2 illustrates an exemplary block diagram of a PUF generator of a device, in accordance with some embodiments of present disclosure.

In some embodiments, the selector 128 may comprise a multiplexer. In some embodiments, the selector 128 is used to select an instruction from a block. Selector 128 is used to ensure the width matches between the cipher block size and the machine instruction width. As discussed above, the block cipher can be of size 128, 192 or 256 bits, while the machine instruction width can be 8, 16 or 32 bits. In some embodiments, when a branch is taken, the new target location may not be at the exact boundary of the larger cipher block. In this case, the entire cipher block containing the target instruction is fetched into a buffer 126 with the cipher text block size. The desired instruction is loaded after the cipher block is decrypted. FIG. 2 illustrates an exemplary block diagram of a PUF generator 200 of a device 102, in accordance with some embodiments of present disclosure. It is noted that the PUF generator 200 is merely an example, and is not intended to limit the present disclosure. Accordingly, it is understood that additional functional blocks can be added in or coupled to the PUF generator 200 of FIG. 2, and that some other functional blocks may only be briefly described herein. In the illustrated embodiment of FIG. 2, the PUF generator 200 comprises a PUF cell array 202, a row decoder 204, and a column decoder 206, that are coupled to a plurality of bit cells (not shown) in the PUF cell array 202. The PUF generator 200 further comprises a sense amplifier 208, an input/output (I/O) circuit 210, a PUF control circuit 212 and a timing control circuit 214, in the illustrated embodiment. All the components may be coupled to each other and further to the PUF control circuit 212 and the timing control circuit 214.

The PUF cell array 202 includes a plurality of bit cells that are arranged in a column-row configuration in which each column has a bit line (BL) and a bit line bar (BLB), and each row has a word line (WL). Further, each column further comprise a supply voltage, i.e., a power supply voltage (VDD), and a ground, i.e., a reference/ground voltage line (GND). More specifically, the BL, BLB, VDD, and GND of each column are respectively coupled to a plurality of bit cells that are disposed in that column, and each bit cell in that column is arranged on a different row and coupled to a respective (different) WL. That is, each bit cell of the PUF cell array 202 is coupled to a BL of a column of the PUF cell array 202, a BLB of the column of the PUF cell array 202, a VDD of the column of the PUF cell array 202, a GND of the column of the PUF cell array 202, a WL of a row of the PUF cell array 202. In some embodiments, the BL's, BLB's, VDD's and GND's are arranged in parallel vertically and the WL's are arranged in parallel horizontally (i.e., perpendicular to the BL's and BLB's). The plurality of bit cells of the PUF cell array 202 may be implemented as any of a variety of types of memory cells such as, for example, 2T-2R (2 transistors-2 resistors) SRAM (Static Random-Access Memory) bit cell, 4T-SRAM bit cell, 8T-SRAM bit cell, 14T-SRAM, DRAM (Dynamic Random-Access Memory) bit cells, etc., according to some embodiments of present disclosure. An illustrated embodiment of the PUF cell array 202 will be provided in further detail below with reference to FIG. 3.

The row decoder 204 is configured to receive a row address of the PUF cell array 202 and enable the WL at that row address. In some embodiments, the column decoder 206 may be optional. The column decoder 206 is configured to receive a column address of the PUF cell array 202 and enable the BL and/or BLB at that column address. The sense amplifier 208 and I/O circuit 210 are configured to access a logical state (i.e., a logical "1" or a logical "0") at each of the plurality of bit cells in the PUF cell array 202. In some embodiments, the logical state of each of the plurality of bit cells in the PUF cell array 202 may be written to or read from a bit cell by the I/O circuit 210. In some embodiments, the PUF generator 200 does not require a sense amplifier 208 if in-bit self-sensing elements are included in the plurality of bit cells.

In some embodiments, such I/O circuit 210 may be directly coupled to the PUF control circuit 212. The PUF control circuit 212 is configured to receive a request/challenge through the I/O circuit 210 (e.g., a request to power on the coupled PUF cell array 202, a request to access the PUF response of the PUF cell array 202, etc.). In some embodiments, the PUF control circuit 212 is configured to transmit a PUF response based on the logical states of the bit cells of the PUF cell array 202 through the I/O circuit 210. The PUF control circuit 212 is further configured to control (e.g., increase or decrease) a voltage level of a VDD and/or GND applied at each of the bit cells, control (e.g., increase or decrease) a voltage level applied at each of the WL. In some embodiments, the PUF control circuit 212 may enable the voltage supply to at least one selected column and at least one selected row. The PUF control circuit 212 may be also used to introduce noises to expedite an identification process during which unstable bit cells which do not provide a constant logical state are identified and later filtered from the PUF response. In some embodiments, the PUF control circuit 212 may control a periodic reading of logical states of the bit cells to count the total number of bit cells that have flipped logical states. In some alternative embodiments, the PUF control circuit 212 may be implemented as a separate block, which is not embedded in the PUF cell array 202. In some embodiments, the PUF control circuit 212 can be embedded in the PUF cell array 202. In some embodiments, the timing control circuit 214 provide control and synchronization on pulse signals during read and write processes. In some embodiments, the PUF control circuit 212 and timing control circuit 214 may be coupled to a common data bus for inter-communication.

Figure 3:
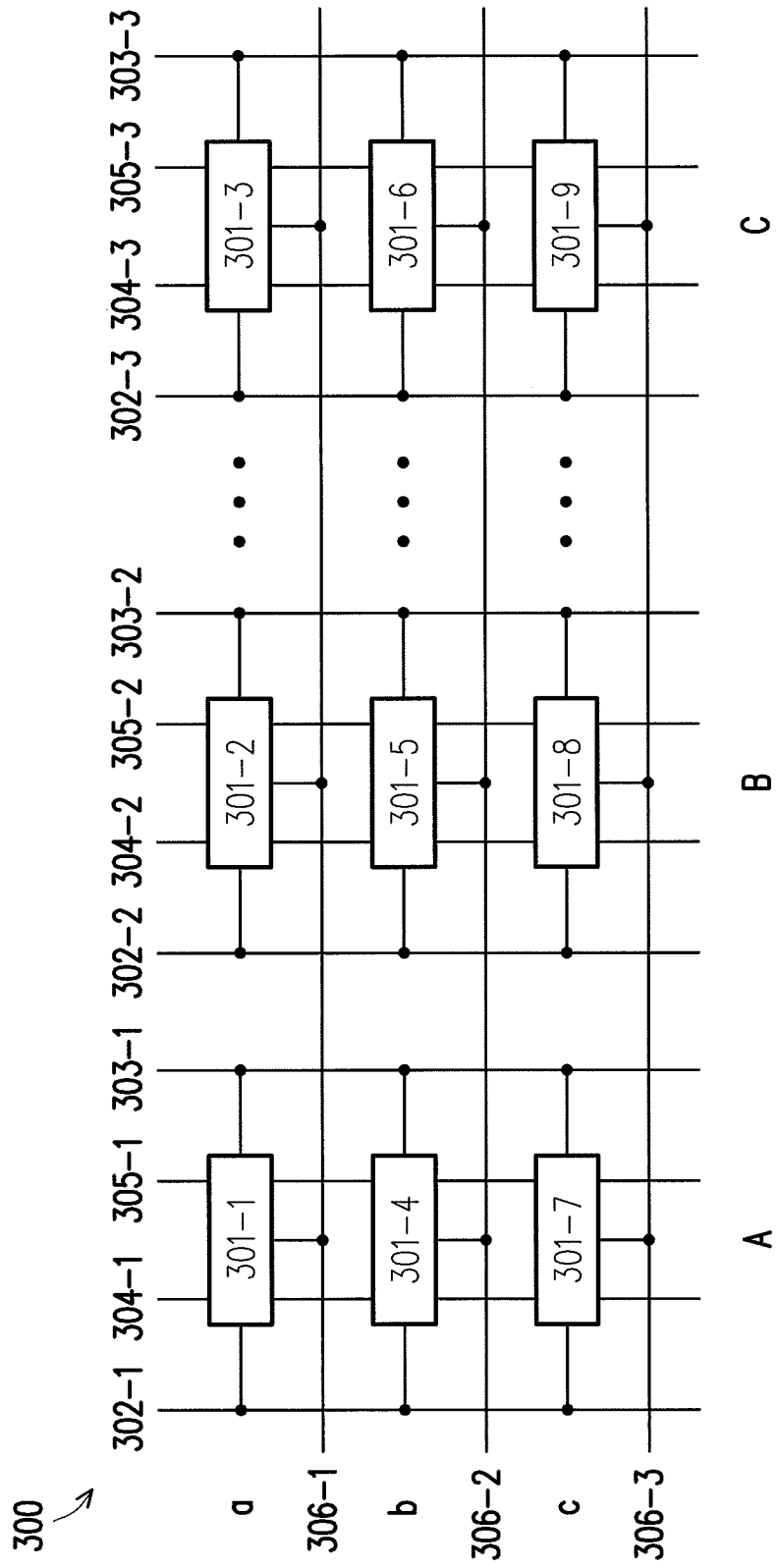
FIG. 3 illustrates an exemplary circuit diagram of a PUF cell array comprising a plurality of bit cells, in accordance with some embodiments of present disclosure.

FIG. 3 illustrates an exemplary circuit diagram of a PUF cell array 202 comprising a plurality of bit cells 301, in accordance with some embodiments of present disclosure. In some embodiments, the PUF cell array 202 includes a plurality of bit cells 301-1, 301-2, 301-3, 301-4, 301-5, 301-6, 301-7, 301-8, and up to 301-9. Although only 9 bit cells are shown, any desired number of bit cells may be included in the PUF cell array 202 while remaining within the scope of the present disclosure. As described above, the bit cells 301-1, 301-2, 301-3, 301-4, 301-5, 301-6, 301-7, 301-8, and 301-9 are arranged in a column-row configuration. More specifically, in some embodiments, the PUF cell array 202 includes bit lines (BL's) 302-1, 302-2, and 302-3 arranged in parallel, bit line bars (BLB's) 303-1, 303-2, and 303-3, arranged in parallel, and word lines (WL's) 306-1, 306-2, and 306-3. The WL's 306 are arranged in parallel orthogonally to the BL's 302 and BLB's 303. In some embodiments, the PUF cell array 202 also includes bit voltage lines (VDD's) 304-1, 304-2, and 304-3, and zero voltage lines (GND's) 305-1, 305-2 and 305-3. As such, the PUF cell array 202 may include a first plurality of columns (e.g., arranged vertically), a second plurality of rows (e.g., arranged horizontally), wherein each column includes a respective pair of BL 302, BLB 303, VDD 304, GND 305, and each row includes a respective WL 306.

For example, as shown in the illustrated embodiment of FIG. 3, the PUF cell array 202 includes columns "A," "B," and "C," and rows "a," "b," and "c," wherein column A includes respective BL 302-1, BLB 303-1, VDD 304-1 and GND 305-1; column B includes respective BL 302-2, BLB 303-2, VDD 304-2 and GND 305-2; column C includes respective BL 302-3, BLB 303-3, VDD 304-3 and GND 305-3; row a includes a respective WL 306-1; row b includes a respective WL 306-2; and row c includes a respective WL 306-3.

Moreover, each column includes one or more bit cells 301 that are each coupled to the column's respective BL, BLB, VDD, GND, and a different separate WL. For example, column A includes bit cells 301-1, 301-4, and 301-7, wherein the bit cells 301-1, 301-4, and 301-7 are each coupled to the BL 302-1, BLB 302-1, VDD 304-1, GND 305-1, WL's 306-1, 306-2, and 306-3, respectively; column B includes bit cells 301-2, 301-5, and 301-8, wherein the bit cells 301-2, 301-5, and 301-8 are each coupled to the BL 2302-2, BLB 303-2, VDD 304-2, GND 305-2, WL's 306-1, 306-2, and 306-3, respectively; and column C includes bit cells 301-3, 301-6, and 301-9, wherein the bit cells 301-3, 301-6, and 301-9 are each coupled to the BL 302-3, BLB 303-3, VDD 304-3, GND 305-3, WL's 306-1, 306-2, and 306-3, respectively. It should be noted the PUF cell array 202 is merely an example is not intend to be limiting. Accordingly, additional or different signal lines can be used in the PUF cell array 202 of FIG. 3 depending on the type of bit cells 301 and PUF generation technologies used in the PUF cell array 202. Furthermore, the signal lines (i.e., BL's 302, BLB's 303, VDD's 304, GND's 305, and WL's 306 in the illustrated embodiment) can be arranged differently according to the fabrication technology and circuit layouts, which are within the scope of the present disclosure.

In some other embodiments, the PUF cell array 202 can be a SRAM (Static Random-Access Memory) PUF, a DRAM (Dynamic Random-Access Memory) PUF, a butterfly PUF, a bistable Ring PUF, a bigital PUF, a magnetic PUF, a metal based PUF, a quantum confinement PUF, a VIA (via-hole) PUF, a photonic PUF, etc. In some embodiments, each bit cell 301 of the PUF cell array 202 (e.g., 301-1, 200-2, 301-3, 301-4, 200-5, 301-6, 200-7, 301-8, 301-9, etc.) may include a plurality of transistors (e.g., six MOSFET's for a 6T-SRAM bit cell, eight MOSFET's for an 8T-SRAM bit, three MOSFET's for an 3T-DRAM bit, twelve MOSFET's for an 12T-SRAM bit, 3T-DRAM, etc.). In some embodiments, a logical state stored in each bit cell may be written to the bit cell by applying either a high state (i.e., a logical "1") or a low state (i.e., a logical "0") through a corresponding BL, BLB, and WL. In some embodiments, a stable logical state of a bit cell can be achieved after stabilizing from a metastable logical state due to intrinsic differences in the bit cells 301.

FIG. 4A illustrates an exemplary block diagram of an encrypter 400 of a server 104 for encrypting software update information using a PUF response received from a device 102, in accordance with some embodiments of the present disclosure. It is noted that the encrypter 400 is merely an example, and is not intended to limit the present disclosure. Accordingly, it is understood that additional functional blocks may be provided in or coupled to the encrypter 400 of FIG. 4A, and that some other functional blocks may only be briefly described herein.

In the illustrated embodiments, the encrypter 400 of the server 104 comprises a linear-feedback shift register (LFSR) 402 and a bitwise exclusive or (XOR) circuit 404. In some embodiments, the LFSR 402 is a shift register whose input bit is a linear function of its previous state. In some embodiments, the LFSR 402 is a 4-bit LFSR or a 4-stage LFSR and further comprises of registers and a XOR gate (not shown). In some embodiments, the bitwise XOR circuit 404 takes two bit patterns of equal length and performs the logical XOR operation on each pair of corresponding bits. In some embodiments, the bitwise XOR circuit 404 is used to invert the selected bits from the LFSR. In some embodiments, the bitwise XOR circuit 404 comprises of a row of XOR gates where each bit of the corresponding two input vectors and the two inputs for each XOR gate.

During operation, a PUF response is used as a seed to start the LFSR process. For each data bit of the software update information, a same number of bits from the LFSR output to XOR is used. The LFSR is loaded with an initial value and shifted one bit to the left at a time for each data bit of the software update information.

Figure 4B:
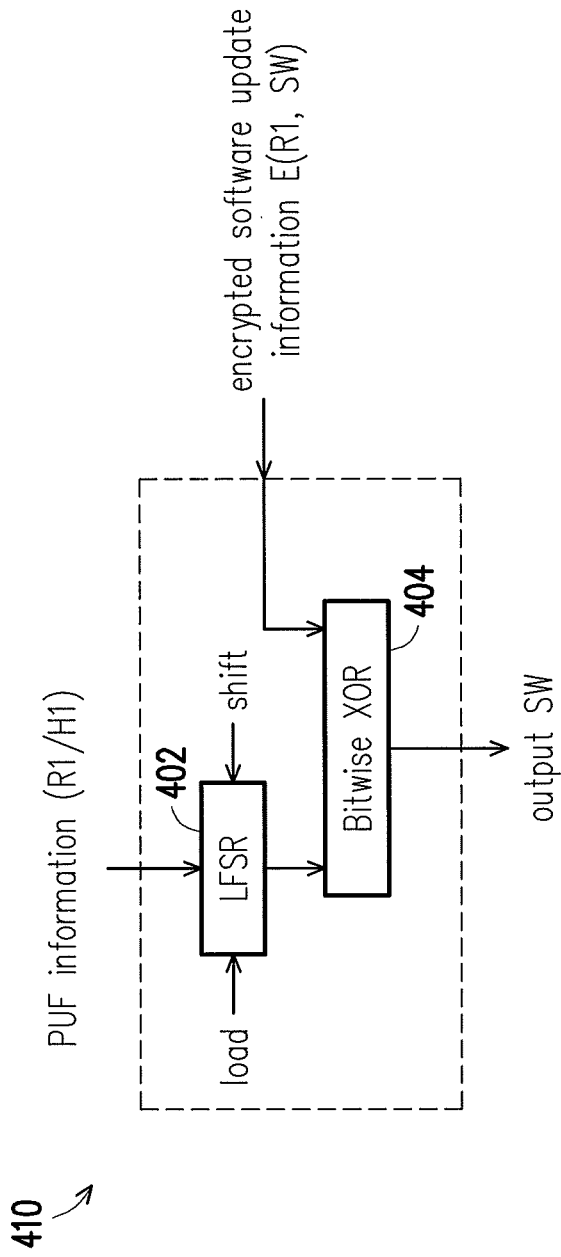
FIG. 4B illustrates an exemplary block diagram of a decrypter of a device for decryption software update using a PUF response, in accordance with some embodiments of the present disclosure.

FIG. 4B illustrates an exemplary block diagram of a decrypter 410 of a device 102 for decryption software update using a PUF response, in accordance with some embodiments of the present disclosure. It is noted that the decrypter 410 is merely an example, and is not intended to limit the present disclosure. Accordingly, it is understood that additional functional blocks may be provided in or coupled to the decrypter 410 of FIG. 4B, and that some other functional blocks may only be briefly described herein.

In the illustrated embodiments, the decrypter 410 comprises a linear-feedback shift register (LFSR) 402 and a bitwise exclusive or (XOR) circuit 404. In some embodiments, the LFSR 402 is a shift register whose input bit is a linear function of its previous state. In some embodiments, the LFSR 402 is an n-bit LFSR or an n-stage LFSR and further comprises of n registers and a plurality of XOR gates. In some embodiments, the bitwise XOR circuit 404 takes two-bit patterns of equal length and performs the logical XOR operation on each pair of corresponding bits. In some embodiments, the bitwise XOR is used to invert the selected bits from the LFSR. In some embodiments, the bitwise XOR circuit 404 comprises of set of 2-input XOR gates. Inputs of the individual XOR gates are corresponding bits of the 2 input bit vectors.

During operation, a PUF response is used as a seed to start the LFSR process. For each data bit of the encrypted software update information, a same number of bits from the LFSR output to XOR is used. The LFSR is loaded with an initial value and shifted one bit at a time for each data bit of the encrypted software update information.

Figure 4C:
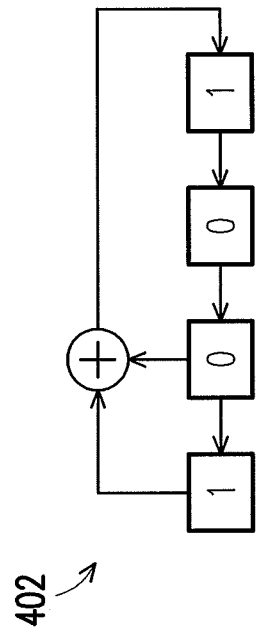
FIG. 4C illustrates an example of a 4-bit linear-feedback shift register (LFSR), in accordance with some embodiments of the present disclosure.

FIG. 4C illustrates an example of a 4-bit linear-feedback shift register (LFSR), in accordance with some embodiments of the present disclosure.

Figure 5:
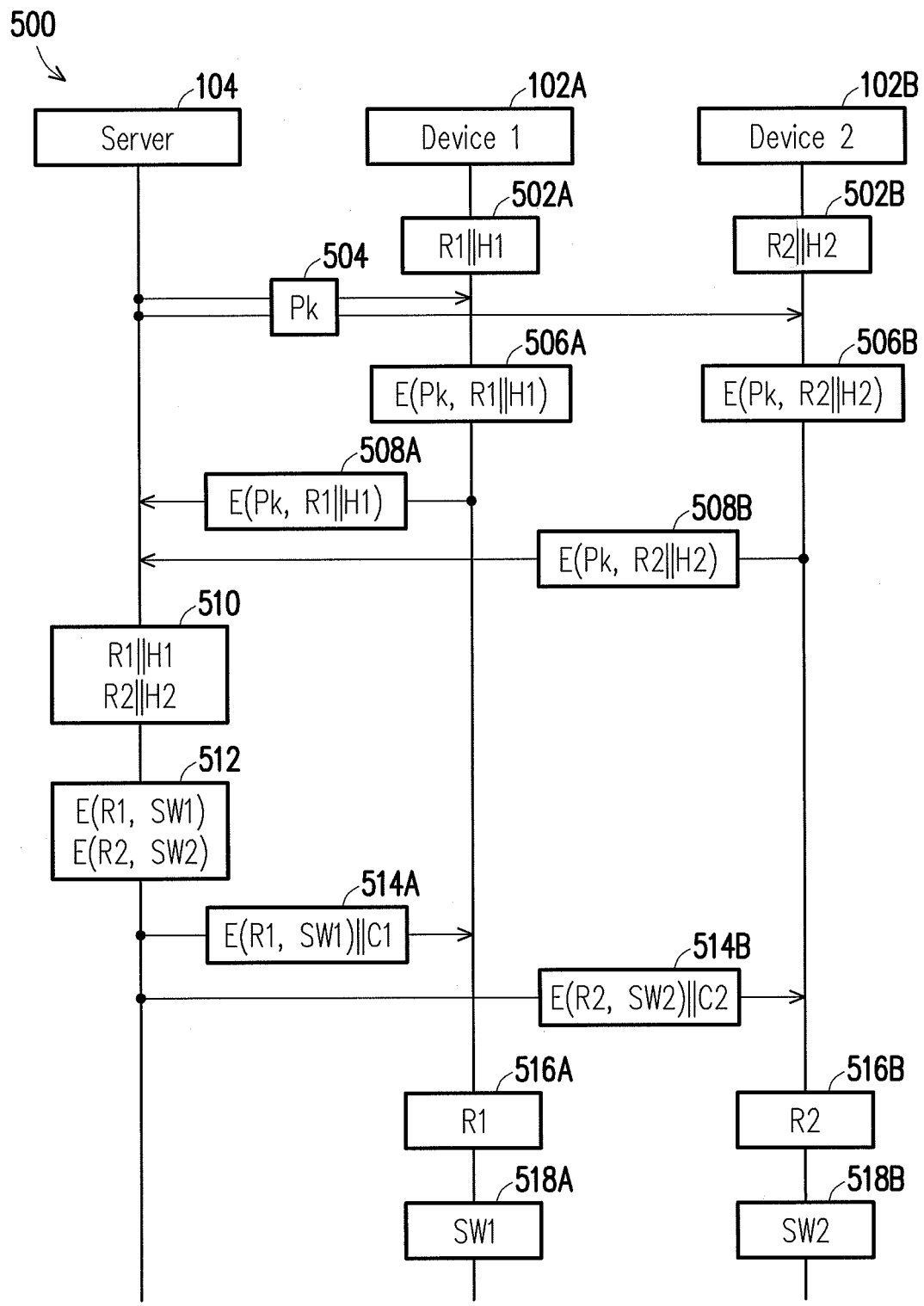
FIG. 5 illustrates a flowchart of a method for securing software update information and sharing secured software update information from a server to a device using a PUF response of the device, in accordance with some embodiments of the present disclosure.

FIG. 5 illustrates a flowchart of a method 500 for securing software update information and sharing secured software update information from a server 104 to a device 102 using a PUF response of the device 102, in accordance with some embodiments of the present disclosure. It is noted that the method 500 is merely an example, and is not intended to limit the present disclosure. Accordingly, it is understood that additional operations may be provided before, during, and after the method 500 of FIG. 5, and that some other operations may only be briefly described herein. In some embodiments, operations of the method 500 may be associated with block diagrams of a device 102, a PUF generator 200, an encrypter 400, and a decrypter 410 as shown in FIGS. 1-4, which will be discussed in further detail below.

The method 500 starts with operation 502, in which PUF information is generated according to some embodiments. In some embodiments, the PUF information comprises a PUF response R and helper data H, wherein the PUF response R is generated by a PUF cell array 202 of a PUF generator 200, which is controlled by the PUF control circuit 212 and the timing control circuit 214 according to the type of bit cells 301 and PUF technology used in the PUF cell array 202. For example, the plurality of bit cells 301 in a PUF cell array 202 each can be a SRAM bit cell comprising cross-coupled inverters with two internal storage nodes, wherein the two internal storage nodes are configured initially with substantially the same voltage levels. Once the cross-coupled inverters are enabled, voltage levels and thus logical states on the two storage nodes of each of the plurality of bit cells 301 are stabilized and used as a unique PUF response. For another example, the plurality of bit cells 301 of the PUF cell array 202 each comprises a DRAM bit cell with at least one storage node which is pre-charged with a voltage level. The charge stored on the at least one storage node changes due to leakage currents in the associated transistors causing a flip of its logical states. Total time that takes for each of the bit cells 301 to flip its logical state varies and the logical states of the plurality of bit cells 301 in the PUF cell array 202 at a certain time can then be used as the unique PUF response. These are merely examples and are not intended to be limit the present disclosure. It should be noted that various types of bit cells based on various types of technologies can be used and are within the scope of this invention.

The PUF information, including the PUF response R and the helper data H are generated from the PUF generator 108 and the helper data generator 106 of the device 102 respectively. Specifically, a first device 102A generates first PUF information (R1∥H1) and a second device 102B generates second PUF information (R2∥H2). In some embodiments, the PUF information of a device 102 is then transmitted through an I/O circuit 210 of a PUF generator 200 to a PUF recovery circuit 112 (e.g., an ECC circuit), where a normal PUF output is recovered from a corrupted PUF output, and further to an encrypter 114 for encryption.

The method 500 continues with operation 504, in which a public key (Pk) is transmitted from the server 104 to the devices 102. In some embodiments, the public key (Pk) is received on the device 102 through corresponding I/O interfaces 122 of the devices 102 through secured communication 124. In some embodiments, the public key (Pk) is previously generated by the server 104. The public key (Pk) is further transmitted to the encrypters 114 of the device 102 for encryption of the corresponding PUF information.

The method 500 continues to operation 506 in which the PUF information is encrypted using a public key. In some embodiments, this encryption is performed by the encrypter 114 of the corresponding device 102. In some embodiments, the encrypter 114 is an asymmetric encrypter. In some other embodiments, the encrypter 114 is a symmetric encrypter. In some embodiments, the asymmetric encrypter may comprise a processor and a control logical circuit (both are not shown in FIG. 1) in order to encrypt the PUF information to be transmitted to the server 104 in response to a request received from the server 104 at the asymmetric encrypter through the I/O interface 122. In some embodiments, the processor of the asymmetric encrypter can select one public key Pk from a plurality of public keys received from the server 104 to encrypt the PUF information. In certain embodiments, the server 104 selects a same public key for each devices 102 within the network. In certain embodiments, the server 104 may select different public keys from a plurality of public keys and assign unique public keys to different devices. This mechanism using multiple public keys provides additional security to the PUF information since an unauthorized server is not able to determine which public key is used to encrypt the PUF information. In some embodiments, the device 102 may change the PUF information generated by a PUF generator 200 that is used for encrypting the software update information periodically.

In some embodiments, a bit-serial version of the encryption engine can be used in the asymmetric encrypter to reduce the overhead. In some embodiments, encryption of the PUF information involves taking the modulus of an exponential function. It should be noted that this is just an example, any types of encryption algorithm in the asymmetric encrypter to generate encrypted PUF information E(Pk, R∥H) for the server from which a request is received, can be used and are within the scope of this invention. In the illustrated embodiment, the devices 102A/102B encrypt the PUF information using the same public key (Pk). Specifically, the device 102A generates an encrypted PUF information E(Pk, R1∥H1) and the device 102B generates an encrypted PUF information E(Pk, R2∥H2). In some embodiments, the encrypter 114 may comprise a linear-feedback shift register (LFSR) and a bitwise exclusive OR (XOR) circuit.

The method 500 continues to operation 508 in which the encrypted PUF information E(Pk, R∥H) is transmitted from the device 102 to the server 104 for decryption of the PUF information, according to some embodiments. In some embodiments, the encrypted PUF information E(Pk, is transmitted to the server 104 through the I/O interface 122 coupled to the encrypter 114, which is used for receiving the public key (Pk) from the server 104 and for transmitting the encrypted PUF information E(Pk, R∥H) to the server 104. In some other embodiments, the device 102 encrypts and transmits all the responses corresponding to all the challenges to the server 104, such that challenge/response pairs of each device 102 of the network are stored in the server 104. Specifically, the first device 102A transmits the encrypted PUF information E(Pk, R1∥H1) and the second device 102B transmits the encrypted PUF information E(Pk, R2∥H2) to the server 104.

The method 500 continues to operation 510 in which the encrypted PUF information E(Pk, R∥H) is decrypted by the server 104 using the public key (Pk) to obtain the corresponding PUF information, according to some embodiments. In some embodiments, the server 104 also comprises a decrypter to decrypt the encrypted PUF information using the pre-generated public key (Pk). In some embodiments, the decrypter of the server 104 can be an asymmetric encrypter which contains one of the following asymmetric key encryption algorithm, such as for example RSA (Rivest-Shamir-Adleman), DSA (Digital Signature Algorithm), ECC (Elliptic Curve Cryptography), ElGamal algarithms, etc. In some embodiments, the asymmetric encrypter uses a private key (Sk) that pairs with the public key (Pk) for decrption. In some embodiments, if the private key (Sk) is able to decrypt the encrypted PUF information E(Pk, R∥H), the PUF information including the PUF signature R and the helper data H can be determined. In some other embodiments, if an unauthorized server uses a private key (Sk) that does not pair with the public key (Pk) to decrypt the encrypted PUF information E(Pk, R∥H), the PUF information including the PUF signature R and the helper data H cannot be obtained. This method in the present disclosure prevents any unauthorized servers from obtaining the PUF information from the device 102, which is used later in a secured communication. In some other embodiments, the server 104 comprises a symmetric decrypter which uses the same public key (Pk) to decrypt the PUF information including the PUF response R and the helper data H. In some embodiments, the server 104 obtains a plurality of PUF responses of the device 104 according to different corresponding challenges. In some embodiments, the server 104 may utilize software for decryption purposes. Specifically, R1∥H1 from the first device 102A and R2∥H2 from the second device 102B can be obtained by the server 104. Upon a successful decryption of the PUF information by the server 104, a secured communication and authentication are established between the server 104 and the devices 102.

The method 500 continues to operation 512 in which encrypted software update information E(R, SW) is further created, according to some embodiments. In some embodiments, the server 104 encrypts software update information (SW) using an encrypter, which receives the PUF response R of the PUF information and software update information stored in its memory unit to generate the encrypted software update information E(R, SW). In some embodiments, the server 104 selects one of the PUF response R from a plurality of responses of the device 102 to encrypt the software update information SW. Specifically, the server 104 generates first encrypted software update information E(R1, SW1) using the PUF response R1 of the first device 102A and second encrypted software update information E(R2, SW2) using the PUF response R2 of the second device 102B. In some embodiments, this process is performed by a software or by a corresponding hardware circuit on the server 104.

The method 500 continues to operation 514 in which encrypted software update information E(R, SW) and a corresponding challenge C are transmitted to the corresponding device 102. In certain embodiments, when the server 104 selects a response R from a plurality of responses of a device 102 for encryption of the software update information, the server 104 also transmits the corresponding challenge C back to the device 102 together with the encrypted software update information E(R, SW)∥C. Specifically, the device 102A receives the encrypted software information E(R1,SW1)∥C1 and the device 102B receives the encrypted software information E(R2, SW2)∥C2 from the server 104. In some other embodiments, the server 104 further transmits the encrypted software update information E(R, SW) with associated helper data H, E(R, SW)∥H to the device 102. Specifically, the device 102A receives the encrypted software information E(R1,SW1)∥H1 and the device 102B receives the encrypted software information E(R2, SW2)∥H2.

The method 500 continues with operation 516, in which a response R is obtained according to the received corresponding challenge C from the server 104 by the device 102. In some embodiments, a PUF generator 200 of a device 102 can generate a plurality of PUF response outputs corresponding to a plurality of challenge inputs. The challenge C corresponding to the PUF response used for encrypting the software update information is then transmitted back to the device 102 from the server 104. The challenge C is further used by the device 102 to obtain the corresponding response R, which is then used to decrypt the encrypted software update information SW. Specifically, the first device 102A uses its C1 to obtain the corresponding R1 and the second device 102B uses C2 to obtain the corresponding R2. In some embodiments, the device 102 generates a noisy PUF response R* and using the helper data H in the received E(R, SW)∥H to remove noises in R* to obtain R.

The method 500 continues with operation 518, in which software update information SW can be obtained. In some embodiments, the device 102 further utilizes the response R to decrypt the encrypted SW. In some embodiments, this can be executed using a decrypter. In some embodiments, the decrypter 116 comprises a linear-feedback shift register (LFSR) and a bitwise XOR circuit. Specifically, the first device 102A obtains SW1 and the device 102B obtains SW2 by decrypting the encrypted SW using corresponding responses R1 and R2 obtained from the challenges C1 and C2, respectively.

FIG. 6 illustrates a table 600 showing a plurality of devices 102 and a plurality of challenge/response pairs of the corresponding devices, in accordance with some embodiments of the present disclosure. In the table 600, column 602 shows a list of devices (i.e., device 1, device 2, and device k), column 604 shows a list of challenges of each devices and their corresponding responses are shown in column 606. For example, device 1 can provide a plurality of responses (i.e., $R_{1-1}$, $R_{1-2}$, . . . ) which correspond to a plurality of challenges (i.e., $C_{1-1}$, $C_{1-2}$, . . . ); device 2 can provide a plurality of responses (i.e., $R_{2-1}$, $R_{2-2}$, . . . ) which correspond to a plurality of challenges (i.e., $C_{2-1}$, $C_{2-2}$, . . . ); and device k can provide a plurality of responses (i.e., $R_{k-1}$, $R_{k-2}$, . . . ) which correspond to a plurality of challenges (i.e., $C_{k-1}$, $C_{k-2}$, . . . ). In some embodiments, each of the devices may comprises the same number of challenge/response pairs. In some other embodiments, the plurality of devices each may comprise a different number of challenge/response pairs.

In some embodiments, the table 600 can be stored in a memory unit of the server 104 upon the reception and decryption of the encrypted PUF information from the device 102. In some embodiments, the table 600 is then used by the server 104 to select one challenge/response pair of each device to encrypt the software update information for corresponding devices. In some embodiments, devices may comprises only 1 challenge/response pair.

In an embodiment, a device for receiving secured software update information from a server, the device includes: a physical unclonable function (PUF) information generator, comprising a PUF cell array, configured to generate PUF information, wherein the PUF information comprises at least one PUF response output, wherein the at least one PUF response output is used to encrypt the software update information on the server so as to generate encrypted software update information; a first encrypter, configured to encrypt the PUF information from the PUF information generator using one of at least one public key from the server so as to generate encrypted PUF information; and a second encrypter, configured to decrypt the encrypted software update information using one of the at least one PUF response output so as to obtain the software update information.

In another embodiment, a method for securing software update information from a server, includes: generating physically unclonable function (PUF) information using a PUF information generator on a device, wherein the PUF information comprises at least one PUF response output and at least one corresponding challenge input; determining at least one encrypted PUF response output using a first encrypter on the device, wherein the at least one encrypted PUF response output is determined by encrypting the at least one PUF response output using one of at least one public key received from the server; transmitting the at least one encrypted PUF response output to the server, wherein a second encrypter on the server is used to decrypt the at least one PUF response output, wherein one of the at least one PUF response output is further used to encrypt the software update information; receiving the encrypted software update information and the corresponding challenge input on the device, wherein a third encrypter on the device is configured to decrypt the encrypted software update information to obtain the software update information using the corresponding PUF response output.

Yet in another embodiment, a system for sharing secured software update information, the system includes: at least one device, wherein the at least one device each comprises a PUF cell array configured to generate at least one PUF response output at corresponding at least one challenge input; a first encrypter configured to encrypt the at least one PUF response output with one of at least one public key; and a second encrypter configured to decrypt encrypted software update information; a server comprising a third encrypter, wherein the third encrypter is configured to decrypt the at least one PUF response from the encrypted at least one PUF response; and an input/output (I/O) interface between each of the at least one device and the server, configured to transmit the at least one public key, the encrypted software update information, and the corresponding challenge input corresponding to the one of the at least one PUF response output used for encrypting the software update information from the server; and receive the at least one encrypted PUF response output from the device.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Although the disclosure has been described in terms of exemplary embodiments, it is not limited thereto. Rather, the appended claims should be construed broadly, to include other variants and embodiments of the disclosure, which may be made by those of ordinary skill in the art without departing from the scope and range of equivalents of the disclosure.

What is claimed is:

1. A device for receiving secured software update information from a server, the device comprising:
   a physical unclonable function (PUF) information generator, comprising a PUF cell array, configured to generate PUF information, wherein the PUF information comprises at least one PUF response output, wherein the at least one PUF response output is used to encrypt the software update information on the server so as to generate encrypted software update information;
   a first encrypter, configured to encrypt the PUF information from the PUF information generator using one of at least one public key from the server so as to generate encrypted PUF information;
   a second encrypter, configured to decrypt the encrypted software update information using one of the at least one PUF response output so as to obtain the software update information;
   a helper data generator configured to remove noise in the at least one PUF response output;
   a memory configured to store the decrypted software update information for execution;
   an input/output (I/O) interface; configured to receive the at least one public key, the encrypted software update information, and the corresponding challenge input corresponding to the at least one PUF response output used for encrypting the software update information from the server, and transmit the at least one encrypted PUF response output from the device; and
   a processor configured to execute the software update information stored in the memory.

2. The device of claim 1, wherein the PUF cell array comprises a plurality of bit cells, wherein the plurality of bit cells is configured to produce the at least one PUF response output at the corresponding challenge input based on logical states of the plurality of bit cells.

3. The device of claim 1, the PUF information further comprises at least one challenge input of the corresponding at least one PUF response output.

4. The device of claim 1, wherein the at least one encrypted PUF response output is further transmitted to the server, wherein a third encrypter of the server is used to decrypt the at least one encrypted PUF response output to obtain the at least one PUF response output.

5. The device of claim 1, wherein the first and the second encrypters each comprises a linear-feedback shift register and a bitwise exclusive OR circuit.

6. The device of claim 1, wherein the at least one public key is pre-generated and stored on the server.

7. The device of claim 1, further comprising:
   a decrypter configured to receive the encrypted software updates, decrypt the encrypted software updates using the at least one PUF response to derive plain text software update instructions.

8. A method for securing software update information from a server to a device, comprising:
   generating physically unclonable function (PUF) information using a PUF information generator on a device, wherein the PUF information comprises at least one PUF response output and at least one corresponding challenge input;
   determining at least one encrypted PUF response output using a first encrypter on the device, wherein the at least one encrypted PUF response output is determined by encrypting the at least one PUF response output using one of at least one public key received from the server;
   transmitting the at least one encrypted PUF response output to the server, wherein a second encrypter on the server is used to decrypt the at least one PUF response output, wherein one of the at least one PUF response output is further used to encrypt the software update information; and
   receiving the encrypted software update information and the corresponding challenge input on the device, wherein a third encrypter on the device is configured to decrypt the encrypted software update information to obtain the software update information using the corresponding PUF response output;
   removing noise in the at least one PUF response output;
   storing the decrypted software update information for execution;
   receiving the at least one public key, the encrypted software update information, and the corresponding challenge input corresponding to the at least one PUF response output used for encrypting the software update information from the server;
   transmitting the at least one encrypted PUF response output from the device; and
   executing the software update information stored in the memory.

9. The method of claim 8, further comprising
determining the corresponding PUF response output according to the challenge input received from the server together with the encrypted software update information.

10. The method of claim 8, wherein the at least one PUF response output is generated using a PUF cell array, wherein the PUF cell array comprises a plurality of bit cells.

11. The method of claim 10, wherein the plurality of bit cells is configured to produce the at least one PUF response output according to corresponding logical states of the plurality of bit cells.

12. The method of claim 8, wherein the PUF information further comprises helper data from a helper data generator on the device, wherein the helper data is configured to remove noise in the at least one PUF response output.

13. The method of claim 8, wherein the at least one public key is pre-generated and stored on the server.

14. The method of claim 8, further comprising:
storing the software update information on a memory unit of the device.

15. A system for sharing secured software update information, the system comprising:
at least one device, wherein the at least one device each comprises
a PUF cell array configured to generate at least one PUF response output at corresponding at least one challenge input;
a first encrypter configured to encrypt the at least one PUF response output with one of at least one public key; and
a second encrypter configured to decrypt encrypted software update information;
a helper data generator configured to remove noise in the at least one PUF response output;
a memory configured to store the decrypted software update information for execution;
a first input/output (I/O) interface; configured to receive the at least one public key, the encrypted software update information, and the corresponding challenge input corresponding to the at least one PUF response output used for encrypting the software update information from the server, and transmit the at least one encrypted PUF response output from the device; and
a processor configured to execute the software update information stored in the memory; and
a server comprising a third encrypter, wherein the third encrypter is configured to decrypt the at least one PUF response from the encrypted at least one PUF response; and
a second input/output (I/O) interface between each of the at least one device and the server, configured to
transmit the at least one public key, the encrypted software update information, and the corresponding challenge input corresponding to the one of the at least one PUF response output used for encrypting the software update information from the server; and
receive the at least one encrypted PUF response output from the device.

16. The system of claim 15, wherein the PUF cell array comprises a plurality of bit cells, configured to produce the at least one PUF response output according to corresponding logical states of the plurality of bit cells.

17. The system of claim 15, wherein the helper data generator is configured to generate helper data to remove noise in the at least one PUF response output.

18. The system of claim 15, wherein the at least one device further comprises:
a decrypter configured to receive the encrypted software updates, decrypt the encrypted software updates using the at least one PUF response to derive plain text software update instructions.

19. The system of claim 15, wherein the first and the second encrypters each comprises a linear-feedback shift register and a bitwise exclusive OR circuit.

20. The system of claim 15, wherein the at least one public key is pre-generated and stored on the server.

* * * * *